(12) United States Patent
Marocco (10) Patent No.: US 6,336,388 B1
(45) Date of Patent: Jan. 8, 2002

(54) ROTARY SAW CUTTER BLIND CUT DOWN MACHINE

(75) Inventor: Norbert Marocco, Woodbridge (CA)

(73) Assignee: Shade-O-Matic Limited, Toronto (CA)

( * ) Notice: Subject to any disclaimer, the term of this patent is extended or adjusted under 35 U.S.C. 154(b) by 0 days.

(21) Appl. No.: 09/360,316

(22) Filed: Jul. 23, 1999

(51) Int. Cl.$^7$ .......................... B26D 7/02; B23D 23/00
(52) U.S. Cl. ............................. 83/454; 83/52; 83/169; 83/197; 83/452; 83/602; 83/622; 29/24.5
(58) Field of Search .............................. 83/13, 52, 169, 83/197, 198, 454, 452, 455, 555, 602, 616, 618, 636, 920; 29/24.5, 33 R, 34 R, 720

(56) References Cited

U.S. PATENT DOCUMENTS 6,089,134 A * 7/2000 Marocco ...................... 83/197

OTHER PUBLICATIONS

Letter to Mr. Roy H Wepner of Lerner, David, Littenberg, Krumholz & Mentlik, LLP dated Apr. 24, 2000, regarding: Formal Demand for Springs t cease and desist unfair competition against Neil Made (Sheldon & Mak File No. 8376.83).
Custom Craft Company Invoice No. 109099, dated Sep. 28, 1989 for PVC made to measure cut down machine 220 volt, 3 phase, billed to Graber Industries, Inc.
Nine (9) photographs of the Carey–McFall unit of Springs (rotary cut–down machine "A") that is similar to the Houde concept.
Four (4) photographs of the Caret–McFall unit of Springs (pneumatic cut–down machine "B") illustrating the cutting portion of the machine.

* cited by examiner

Primary Examiner—W. Donald Bray
(74) Attorney, Agent, or Firm—Ohlandt, Greeley, Ruggiero & Perle, L.L.P.

(57) ABSTRACT

A blind cut-down apparatus for cutting and sawing a blind having at least a head rail component, and blind slats suspended from the head rail, and having a blind holding plate with an opening for holding the components in position for cutting, a slat cutting saw moveable relative to the holding plate for cutting blind components held in the holding plate, and including a movement device for moving the cutting saw and the cutting die holder. Also disclosed is a method of saw cutting ends of blind components in which the blind components are held in a head plate and in which a saw balde cuts the components.

17 Claims, 7 Drawing Sheets

ROTARY SAW CUTTER BLIND CUT DOWN MACHINE

FIELD OF THE INVENTION

The invention relates to a machine for trimming the ends of blinds and window coverings, in which the slats are formed of materials requiring a saw cut.

BACKGROUND OF THE INVENTION

Blinds and window coverings are available in a variety of materials. Horizontal blinds are available in which the head rail, and in some cases, the bottom rails are formed of metal, usually steel, and in which the slats are formed of wood. In other cases slats may be formed of materials such as thick thermo plastic or other heavier materials.

In some cases blinds may be available in which the slats are vertical being secured usually at the top to a head rail typically made of steel. Bottom rails are not usually required on this type of blind, since the slats are relatively heavy.

Such blinds must be fitted to the width, or in some cases the height and width, of the window or other opening for which they are intended. In the past blinds have been made in a factory, on a custom basis to a particular width (and height) specified by the purchaser. A salesperson would usually have had to call on the customer and take an order. However, it is more convenient to manufacture blinds and window coverings in certain standard widths, and stock these standard widths in a retail store. A customer may then simply come into the store and buy a blind slightly wider than the desired width (or longer than the height), and have it trimmed at the ends to the desired width (or height). This is both more economical, and thus more readily saleable, and at the same time provides the customer with an opportunity to purchase blinds in a retail establishment and walk out of the store with them in his possession, rather than meeting a salesperson at home, and waiting a few weeks for them to be fabricated in a factory.

In the past various apparatus has been designed for cutting down widths of horizontal blinds of specific designs and specific materials. However, in general terms, these machines have not been totally suitable for cutting down blinds in which the slats are made of heavier (or thicker) materials, such as wood or thick thermoplastic.

In addition to these factors, blinds and window coverings are also available in which blind slats are suspended vertically from a head rail. These blind slats may be drawn to one side or the other of the window opening, or in some cases to both sides, and may be rotated between open and closed positions, by a mechanism located in the head rail. Again, these blinds usually required a sales call, at the home, followed by custom fabrication in a factory.

Advantageously, these blinds too would be provided in standard widths, in a retail store and it would be desirable to provide an apparatus in the store for cutting down the width of the head rail, and also the lengths of the vertical slats, in the case of vertical blinds. Vertical blinds, as well as horizontal blinds, also use blind slats which are made of heavier or thicker materials such as wood or thick thermoplastic, and earlier machines such as those using shears or cutting blades are not suitable for cutting blind slats either vertical or horizontal, made of these thicker materials.

Preferably, in order to economize in-store installations of cut-down equipment and also to simplify instruction of staff, a single cut-down machine will be provided which enables blinds having a metal head rail, and having slats formed of these heavier materials to be cut down to the desired width (or height) in a single machine.

One of the considerations in designing such a cut-down machine is the manual effort that is required to operate the machine to cut through the head rail materials and the different cutting action, namely a saw cut for the heavier (and thicker) slat materials.

Clearly, metal such as steel, used in head rails, is relatively hard to cut. On the other hand, since the sections used in this type of product are relatively thin, the die for cutting the metal components of the blind may only be required to move a short distance.

Consequently, so long as adequate leverage is provided to move the metal cutting die a relatively short distance, this problem can be addressed.

On the other hand, the cutting of the blind slats themselves presents entirely different problems. In this type of blind the slats are made of relatively thick materials which while easier to cut require a saw blade action. The thickness of all of the blind slats of these heavier materials when bundled together for cutting is considerable. Consequently, the saw for cutting these heavier, thicker blind slats must move a considerable distance.

While it is relatively easy to provide for the manual operation of such a saw moving a considerable distance for cutting easier to cut thicker materials, the problem becomes more complex when it is understood that it is desirable, at least in the case of horizontal blinds, to cut all of the materials, both the metal head rail and the softer blind slats, in what is essentially a single cutting stroke.

This is because, at least in the case of horizontal blinds, the trimming of the ends of the head rails and slats must in most cases be carried out, so that the blind has a precisely measured width along each side, and the widths of the blind slats correspond to the widths of the head rail and bottom rail. This is not so important in the case of vertical blinds, but is still desirable.

It is not feasible to provide two machines, i.e. a first machine which cuts only the head rail which is usually made of steel, and a second machine for an entirely separate cut for cutting the softer, thicker blind slats.

The moving of the blind from one machine to another will almost inevitably result in some discrepancy between the amount cut off from the head rail and the amount cut off from the blind slats, and the end result will not be satisfactory.

For these reasons therefore the provision of a cutdown machine meeting all of these objectives, i.e. being capable of cutting through both the softer but thicker blind slats, and the harder but thinner metal head rail and bottom rail, in a single manual cutting movement, and being capable of saw cutting thicker materials, presents a complex problem.

The complexity of the design is further aggravated by the fact that (in the case of horizontal blinds) the head rail is located at the head of the blind and is usually made of metal, eg. steel, and the blind slats (of thicker material) are located spaced below the head rail. Consequently, when trimming the blind it is necessary to provide cutting dies for cutting head rails and for substantially simultaneously saw cutting the thicker blind slats. It will of course be appreciated that in the case of horizontal, i.e. Venetian blinds, all of these cuts must be made in a common plane, so as to provide a uniform end trimming function on the blind. Even for vertical blinds, the vertical blind slats must be trimmed, along their lower ends, by cutting all the slat ends along a common plane.

A further factor in this type of apparatus is that as far as possible it is desirable to simplify its operation for the service personnel in the retail outlet, so that the cutting or trimming of the ends of the blind may be carried out with the least possible chance for error. Preferably, in order to do this, the apparatus will be constructed in such a way that a single movement of a manual cutting arm or lever, will produce the cut down or trim function both in respect of the head rail cutting die and also the closure element saw blade, so that all the components of the blind are trimmed with a single manual stroke. When referring to a "manual" stroke it will be appreciated that, in fact, the apparatus could be power operated. In some cases the lead rails may also be of softer material, such as thermoplastic, and in these cases saw blade cutting jmay be used to trim the ends of all the blind components.

It will further be appreciated that this type of equipment will be used by service personnel in retail establishments. As such, while they will have a certain degree of training, they will usually have numerous other duties, and may in fact be working somewhat under pressure, while a customer is actually waiting. Consequently, it is desirable as far as possible to make the apparatus as simple to operate as is possible.

For this reason, it is desirable that the operating mechanism, in this case for example, a manual lever, shall operate both the head rail cutting die and also the closure element cutting saw.

Consequently, it is desirable to provide some form of linkage in which both the die and the saw are operated.

It will also be appreciated that while reference is made to manual operation, it is conceivable that some form of power operated means could be provided, which would still require some degree of manual operation, if only to simply press a switch. Manual operation is deemed to be generic to all such forms of operation whether power assisted, or not.

BRIEF SUMMARY OF THE INVENTION

With a view to providing a blind cutdown apparatus which addresses the various foregoing conflicting problems, the invention comprises a blind cut-down apparatus for cutting and sawing a blind having at least a head rail component of thin material, and blind slats of thicker material suspended from the head rail, and comprising a blind holding plate having at least a head rail opening and a slat opening formed therein for receiving respective components of a blind there through, and holding them in position for cutting, a slat cutting saw moveable relative to said holding plate, for cutting blind slats extending through said holding plate, a cutting die holder adjacent to said cutting saw, said cutting die holder carrying at least one cutting die for receiving said head rail there through, and being moveable relative to said holding plate for cutting said head rail, and including movement means for moving said cutting saw and said cutting die holder substantially simultaneously, whereby both said blind slats and said head rail may be cut substantially simultaneously and in a common plane along the surface of said holding plate.

The invention further provides for such a cut down apparatus and including a head rail cutting die secured to said holding plate, and said head rail cutting die being mounted to said die holder, whereby said head rail cutting die may move relative to said holding plate for cutting said head rail extending there through.

The invention further provides such an apparatus and further having a saw blade guide attached to said holding plate and said saw blade being moveable there along relative to said holding plate.

The invention further provides such an apparatus and in which manual movement means are provides for moving both said cutting die and said saw blade, with said cutting die moving a short distance, and said saw blade moving a greater distance and in a common plane, under the influence of a single manual operating means.

The invention further provides for a slat clamping mechanism operable to clamp a bundle of slats extending through said holding plate, whereby to hold them stationary during operation of said saw blade.

The invention further provides that the saw blade is operated by an electric motor, the saw blade comprising a rotatable saw disk.

The invention further provides that the cutting die guide shall provide a cutting die movement path which is diagonal to the movement path of said saw blade.

The invention further provides such an apparatus and including a vacuum fan and vacuum nozzle, located adjacent to said saw blade collecting saw cut debris resulting from the operation of said saw.

The invention further provides such an apparatus wherein the manual operation means comprises a rotary shaft, a manual lever connected to said shaft, an operating cam connected to said shaft and engaging said cutting die, and a movement transmission lever connected between said shaft and said saw blade, said transmission means are being operable through a path of movement greater than the path of movement of said cutting die.

In a simplified form of the invention, both the head rail, and the blind slats, and even the bottom rail, can all be cut by a single saw cutting blade, and they can all be held in a single clamp opening. This will become possible where, for example, the head rail and bottom rail are made out of a non-metallic material such that it is easily cut by means of a saw blade.

The various features of novelty which characterize the invention are pointed out with more particularity in the claims annexed to and forming a part of this disclosure. For a better understanding of the invention, its operating advantages and specific objects attained by its use, reference should be made to the accompanying drawings and descriptive matter in which there are illustrated and described preferred embodiments of the invention.

DESCRIPTION OF A SPECIFIC EMBODIMENT

Figure 1:
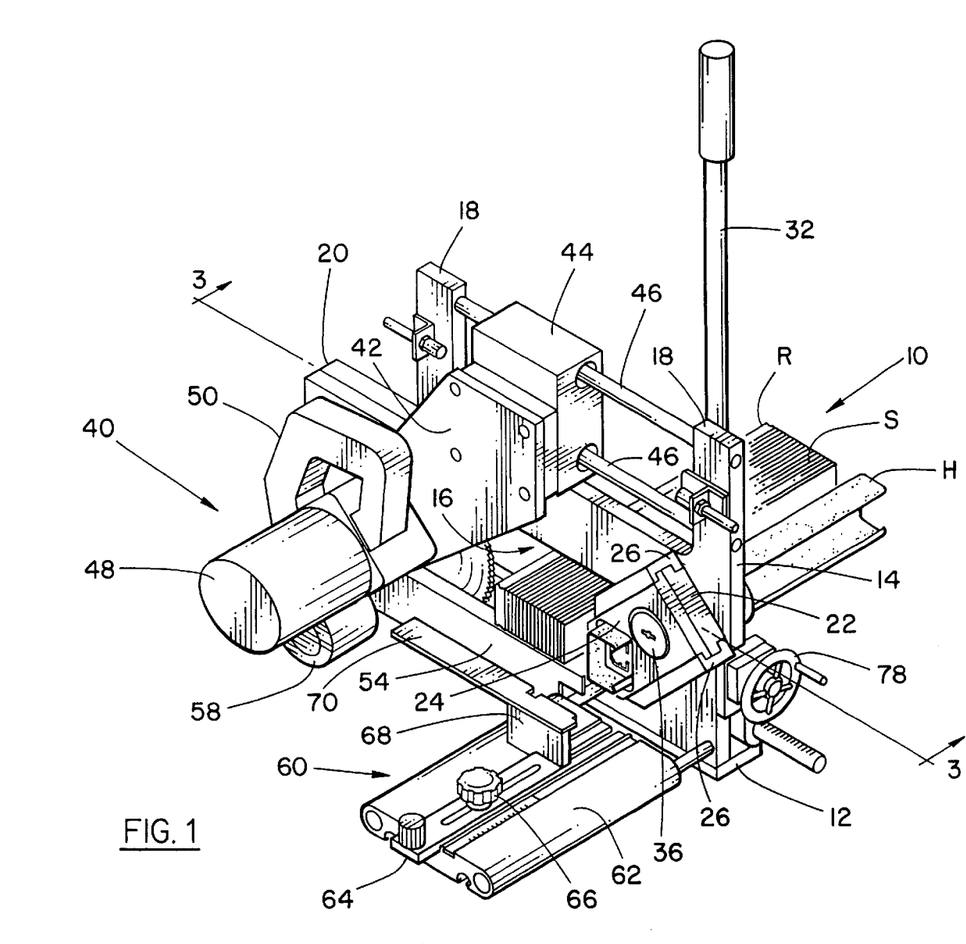
FIG. 1 is a perspective illustration of a rotary saw cut down machine from the saw blade side, illustrating the invention and showing blind components inserted therein.
Figure 2:
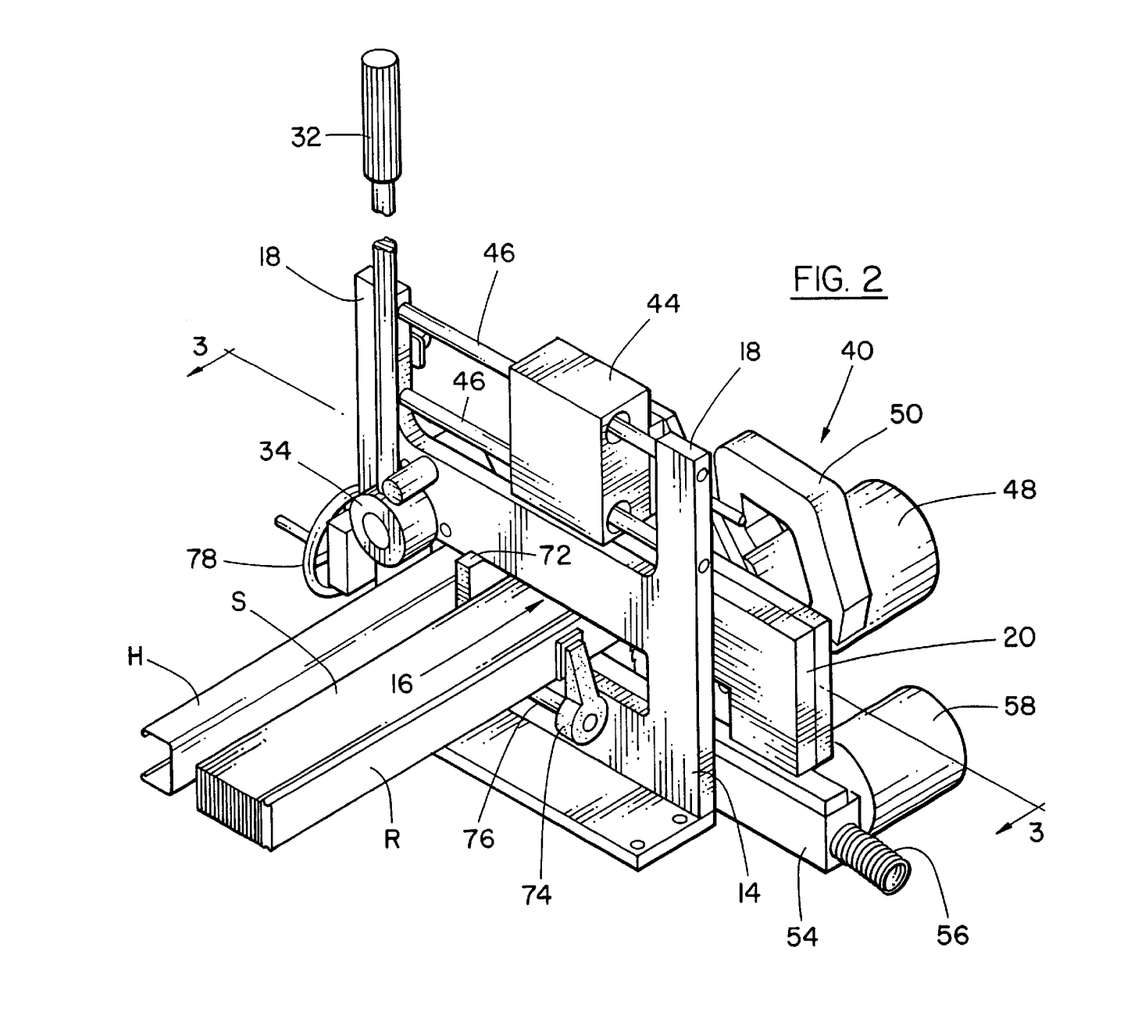
FIG. 2 is a perspective illustration of the apparatus of FIG. 1 viewed from the opposite side.
Figure 3:
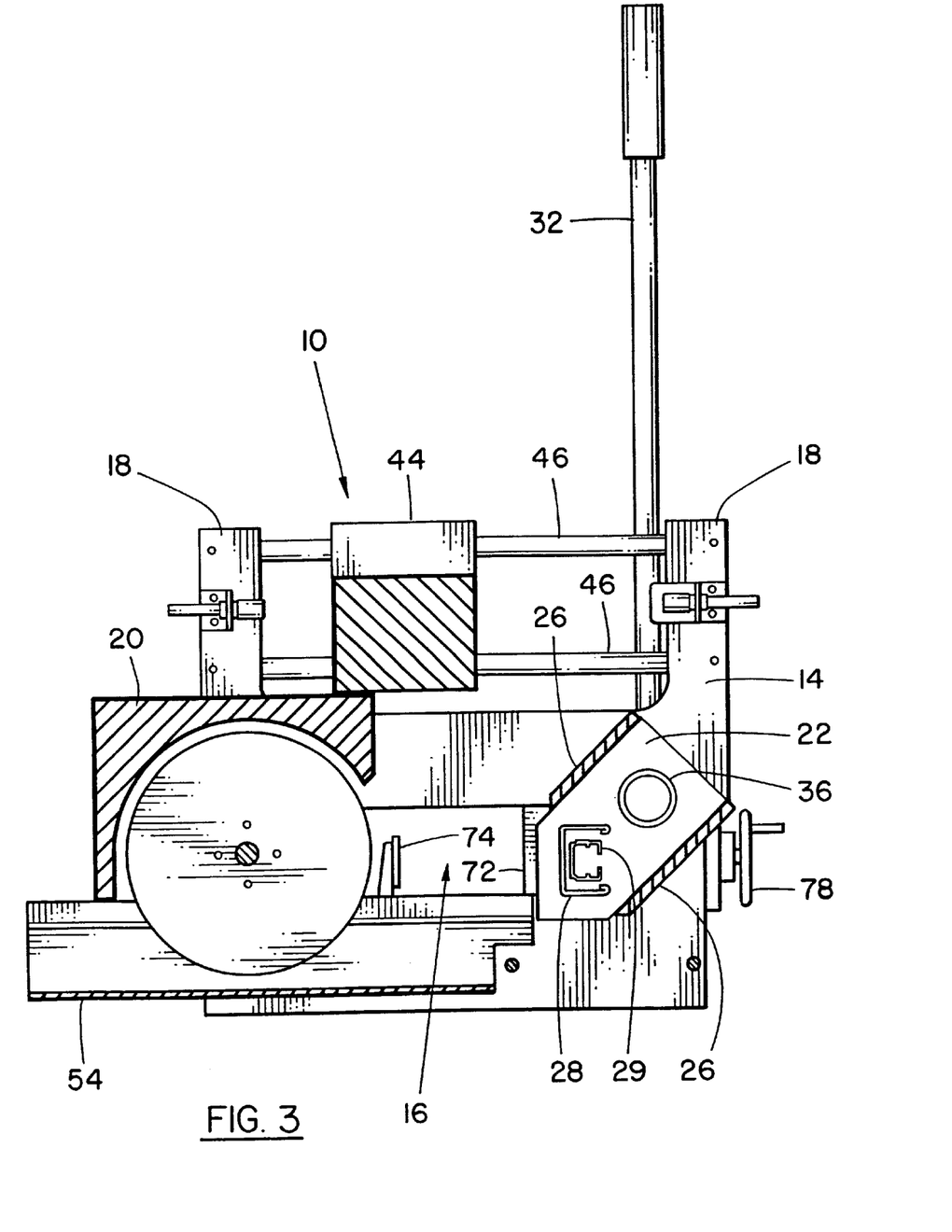
FIG. 3 is a section along the line 3—3 of FIG. 1.

Referring first of all to FIGS. 1 and 2, the invention is there illustrated in the form of a blind cut down machine indicated generally as 10. Such a machine is intended to be installed at a retail store, and would be bolted on a working surface somewhere in a service area away from the customers.

As explained above the purpose of the apparatus 10 is to be capable of trimming the head rail and slats both of horizontal or so called Venetian blinds, and also the head rail and slats of vertical blinds.

Where a Venetian blind has a bottom rail, then the apparatus is also capable is cutting down the bottom rail, if such a blind has a bottom rail.

It should also be understood that in the case of Venetian blinds, the Venetian blind is already assembled so that there are so called ladder tapes and also raise cords which are already attached to the slats, and connected to the head rail.

As a result, when trimming the ends of the blind head rail and slats, in Venetian blinds it will be understood that it is necessary to insert both the head rail (and bottom rail) and the slats into the trimming apparatus at the same time, so that the trim cuts are made in a common plane. It will be further understood that in the great majority of cases, when trimming a Venetian blind, it is necessary to trim the head rail (and bottom rail) and slats at both ends, so as to produce an even appearance in the finished cut down blind. If, for example, the blind must be cut down by, for example, a total of two inches, then the slats and the head rail (and bottom rail) at each end will have to be cut down by an amount of one inch, so as to produce a total two inch cut down.

On the other hand, with vertical blinds, the normal industry practice is to supply the head rail with its trollies, and operating mechanism, and to supply a group of closure elements, ie. blind slats, in a package, with the slats separate from and detached from the head rail. In this case, the normal practice is to cut down the head rail at one end only, since the controls for the blind are usually located in a fixed location at the opposite end of the head rail.

The blind slats will usually be cut down only along their lower ends, since they are usually provided with some form of attachment means at their upper ends for connecting to the trollies in the head rail when the blind is finally assembled and installed.

From this preliminary outline, it will be understood that the apparatus illustrated should preferably perform these varied functions on different types of blind products, so that a single cut down machine may be supplied to the retailer and the retail staff trained on that single machine, thereby avoiding the expense of supplying several different cut down machines and training staff on several machines.

Referring once again to the drawings, the apparatus 10 will be seen in this 20 embodiment to comprise a base or mounting plate 12, and a frame plate 14 mounted thereon perpendicular thereto. The frame plate 14 is provided with a rectangular opening 16 for receiving blind components typically a head rail indicated as H, and closely spaced thereto, closure elements ie. blind slats S, and in this case, a blind bottom rail R. The blind illustrated, typically would be a Venetian blind, and it will be understood that the ladder tapes and raise cords are not illustrated simply for the sake of clarity, and to avoid complexity in the illustration. Frame plate 14 also defines two upwardly directed support arms 18—18, defining between them a generally U-shaped rectangular space, for reasons to be described below. Mounted on frame plate 14 there is a spacer plate 20, and head plate 22.

In order to cut the head rail H which typically will be made of thin relatively hard material, typically metal, a moveable die mounting plate 24 is provided. The plate 22 and the moveable plate 24 are mounted in a common pair of channels 26—26 - secured to frame plate 14. Head plate 22 defines a rectangular slot like opening 28 of a shape that corresponds to the shape of the head rail H1 so as to hold it securely during cutting. In this particular embodiment, provision is made for two different shapes of head rails H1 and n1. For this purpose, a second H1 opening 29 is provided, which in this case, is located within the dimensions of the opening 28 for head rail H1.

Moveable die plate 24 carries with it a cutting die 30 which has a corresponding rectangular slotted recess corresponding to the shape of the head rail H1 and opening 28. Moveable plate 24 also carries a second cutting die 31, located within the dimensions of the cutting die 30, for cutting the smaller head rail placed through the smaller head rail opening 29.

Movement of the moveable plate 24 relative to the fixed head plate 22 will cause movement of the cutting die 30 (or 31) and this will sever or shear the material of the head rail. It will be appreciated that since the head rail is of relatively thin gauge material, the die plate 24 will not move a great distance. On the other hand, considerable force must be exerted on the die plate 24 in order for it to perform the shearing action. It will also be noted from FIGS. 1 and 2 that the channels 26—26 which hold and control the moveable die plate 24, also define its path of movement relative to the head rail. This path of movement will be seen to be in a generally diagonal direction. The reason for this is that the shearing action of the cutting die 30 is preferably of a progressive nature, and will shear the head rail in a direction which is diagonal to its rectangular cross section from one corner to the other.

The moveable die plate 24 is moved by means of the manual lever 32. Lever 32 is coupled to a drive shaft 34. Shaft 34 extends through frame plate 14 and through fixed plate 22. Within fixed plate 22, there is mounted an offset drive stub shaft 36. By this means, by manual operation of lever 32, the shaft 32 can be rotated thereby rotating and causing an orbital movement of the drive stub shaft 36. This will cause sliding movement of the plate 24 relative to the fixed plate 22, thereby shearing the head rail.

The saw cutting assembly for cutting the closure elements (and bottom rail) is indicated generally as 40. It will be seen to comprise a saw blade mounting plate 42, which is secured to a slide block 44. Block 44 is mounted on slide rails 46—46 extending between the upright arms 18.

On the lower end of the saw plate 42, there is mounted a rotary saw assembly indicated as 48. The saw assembly 48 is essentially a typical electric motor, coupled by a shaft (not shown) to a rotary saw blade 49 of a type well known in the art. For simplicity, an operating handle 50 may be provided, on the saw assembly 48, for manually drawing the saw 48 to and fro along the rails 46. The spacer plate 20 is secured to the frame plate 14, so as to space the saw mounting plate 42 in the correct plane, so as to bring the saw blade into alignment with the interface between the fixed plate 22 and the moveable die plate 24. This is required so that the trimming cut down action both of the saw blade and of the moveable die plate 24, shall produce trimming of both the head rail and the blind slats, and the bottom rail where it is included in a common plane.

In order to ensure that the saw debris does not fly about, a hollow collection tube 54 is provided. Tube 54 is provided with a plurality of openings (not shown) along the length of the saw blade travel.

One end the hollow tube 54 may be connected, for example, by vacuum hose 56 (FIG. 2) to a vacuum pump and motor which are indicated generally as 58.

In order to preset the length of end trim or cut down on any particular job, the length cutting control indicated generally at 60 is provided. The length control 60 comprises a generally horizontal plate 62. A slideable bar 64 is moveably connected to plate 62 by means of threaded screw 66. A generally L-shaped spacer block 68 is secured to the end of bar 64. A blind contact plate 70 is attached to the block 68 and is oriented to a contact at the ends of the head rails H and the blind slat S and the bottom rail.

The blind contact plate No and spacer block 68 may, in some cases, be connected to the lever 32 and shaft 34 so that it moves away from the ends of the blind component but this is not always necessary and consequently, the mechanism is not described in detail.

In order to clamp the blind slats S and bottom rail R in position, to be held firmly during the operation of the saw blade, a clamp plate 72 is provided, secured to frame plate 14. A moveable clamp arm 74 is mounted on a screw shaft 76. A hand wheel 78 permits the screw shaft to be drawn to and fro, thereby drawing the clamp arm into contact with the blind slats and bottom rail (FIG. 2).

In operation, the head rail H and blind slats S and bottom rail R are inserted as shown in FIGS. 1 and 2. The clamp arm 74 is operated so as to clamp the blind slats S and bottom rail R in position.

The lever 32 is then operated so as to move the moveable die plate 24 (FIGS. 4 and 5) thereby severing the head rail.

Figure 4:
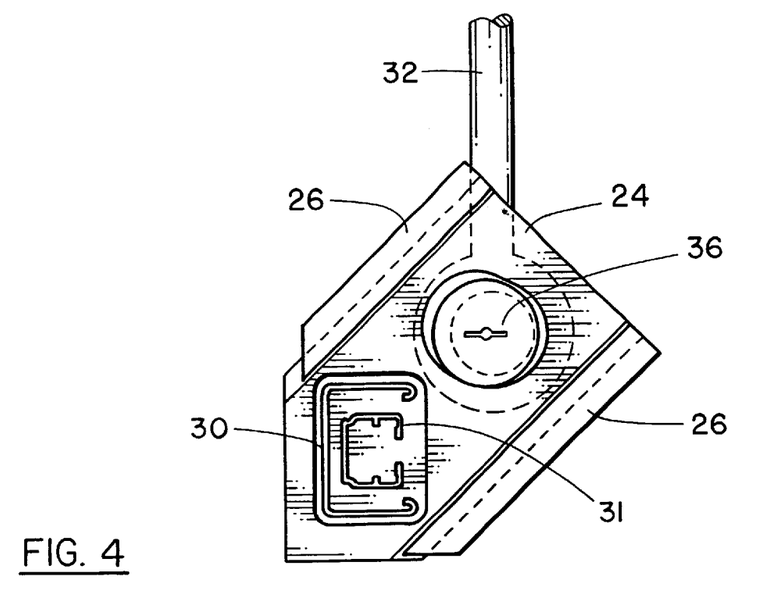
FIG. 4 is a schematic side illustration of the head rail cut down die portion of the apparatus, shown in a first position.
Figure 5:
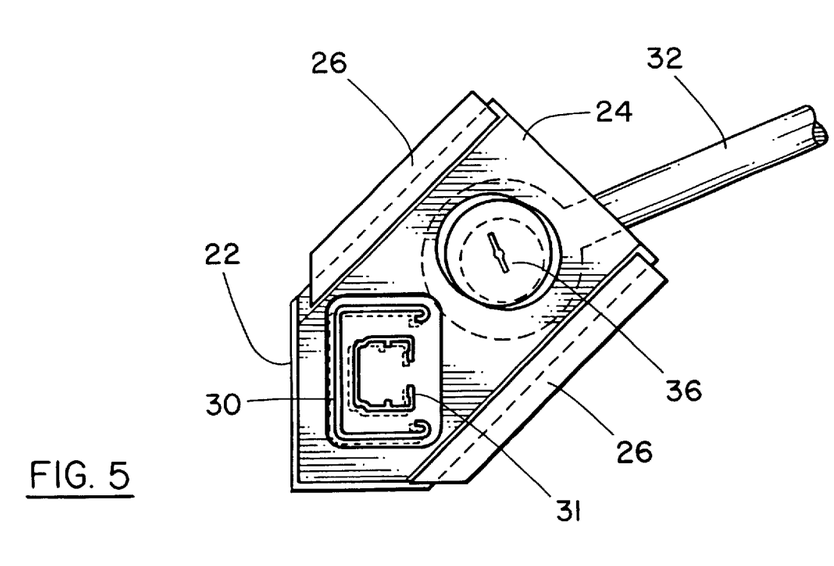
FIG. 5 is a view corresponding to FIG. 1 showing the cut down die in a second position, and showing movement in phantom.

Thereafter, the operator may simply manually grasp the handle 50 and switch on the motor 48, by any suitable electrical switch (not shown). The saw blade is then drawn through the blind slats and the bottom rail.

All of the blind components therefore are cut in a common plane while being held in position in the apparatus.

Figure 6:
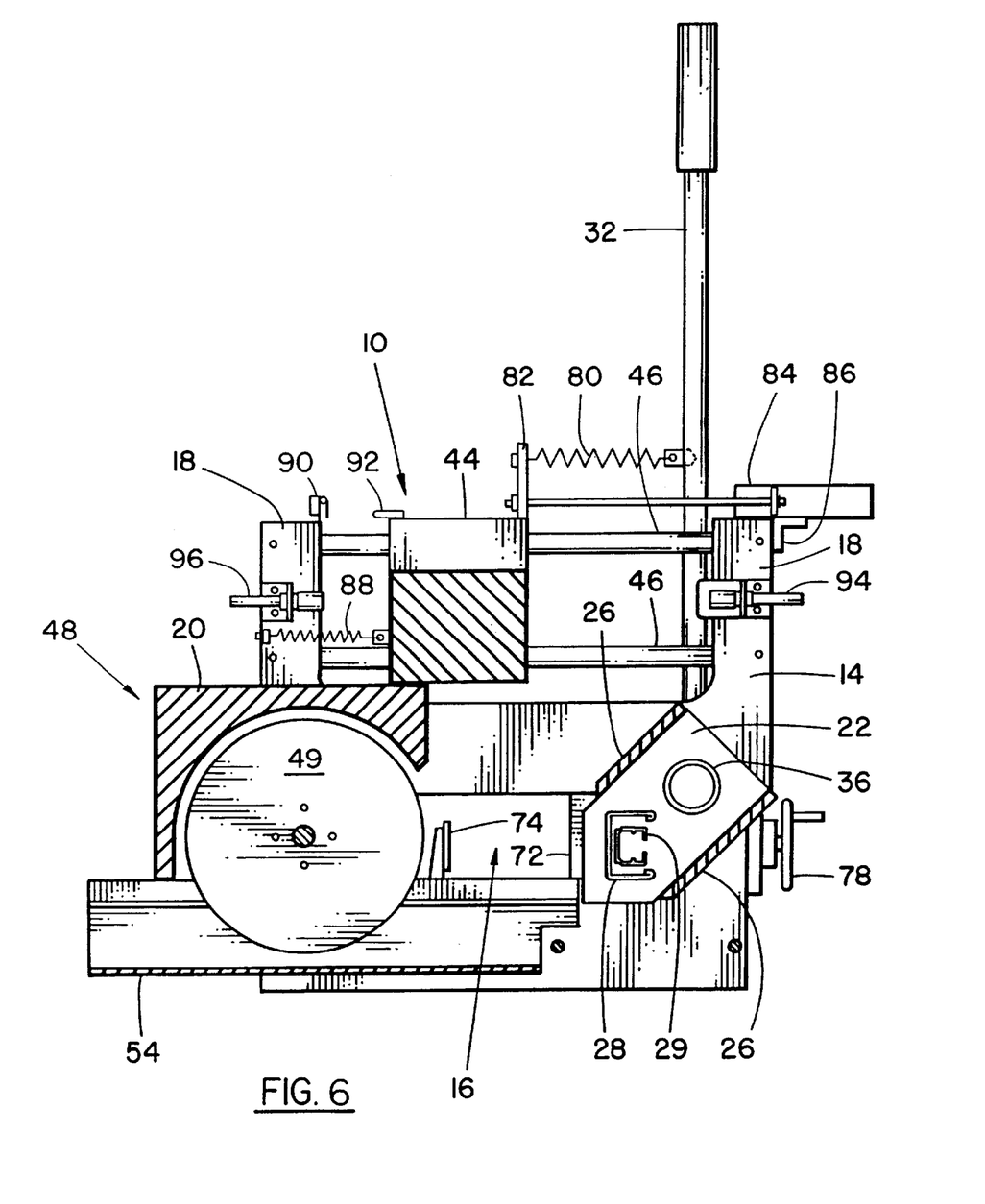
FIG. 6 is a side elevational view of a further embodiment of the cutdown machine.

As shown in FIG. 6, the operation of the operating means in this case, the lever 32, although other operating means could be used whether hand operated or power operated, for operating the die plate 24, and the operation of the saw assembly 48 and its sliding mount 44, may be coupled together. In order to provide this coupling, a first spring 80 may be provided. The spring 80 is connected between the lever 32 and a connecting bar 82 which is itself mounted on the slide block 44. Manual operation of the lever 32 will thus be communicated to the slide block 44 by the increased tension developed in spring 80.

In order to provide a slow progressive movement of the saw assembly, a damper means, namely a control cylinder 84 is provided. Cylinder 84 is mounted on a flange 86 on plate 18, and the piston rod of cylinder 84 is connected to bar 82.

The operation of the cylinder 84 is such as to cause a progressive gradual movement of the saw blade assembly 48 (FIG. 7), in response to tensioning of the spring 80, thereby producing a slow, progressive, gradual movement of the saw blade assembly 48 so as to provide a smooth, regular cut through the ends of the blind closure elements and bottom rail.

Figure 7:
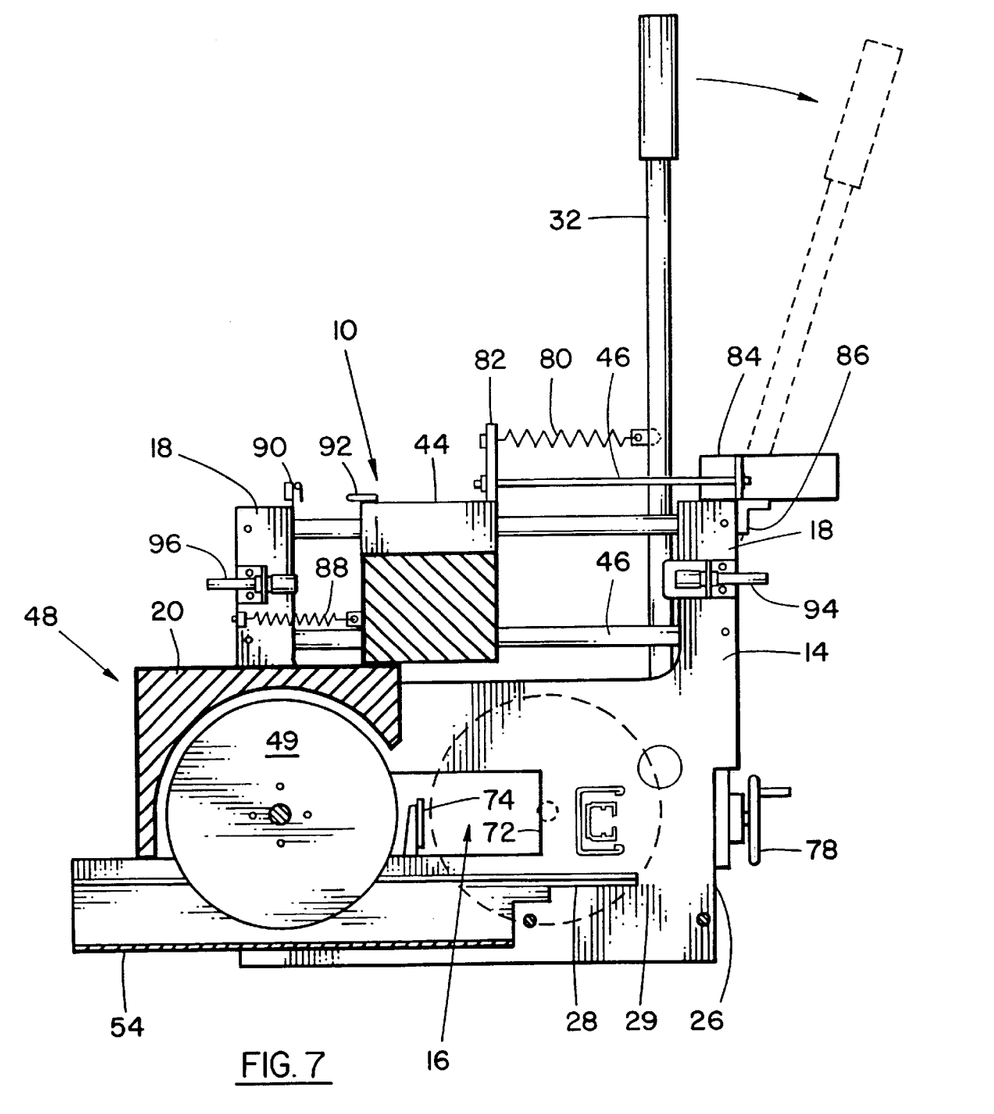
FIG. 7 is a side elevation view of the apparatus of FIG. 6.

In order to return the block 44, and the saw blade assembly 48, the return spring 88 is provided. Spring 88 connects between block 44 and frame 18.

In order to provide automatic on/off operation of the saw blade assembly 48, a typical limit switch 90 is provided, being operated by a finger 92 on block 44. As soon as the spring 80 is placed in tension, the finger 92 will release the limits switch 90 thereby activating the motor in the saw blade assembly 48.

Once the return spring 88 returns to the block 44, the finger 92 will contact the switch 90 and thereby shut off power to the motor and stop the saw blade assembly 48.

In addition, suitable end stops 94 and 96 may be provided on the two frame portions 18—18, so as to limit the length of travel of the block 44.

While the apparatus already described is suitable for use where, for example, the headrail is made of a metallic material, and the slats and bottom rail are made of a softer material suitable for cutting by means of a saw blade, it will be appreciated that in certain cases it may be possible to fabricate the head rail itself out of a softer material, so that it too may be cut by a saw blade.

Figure 8:
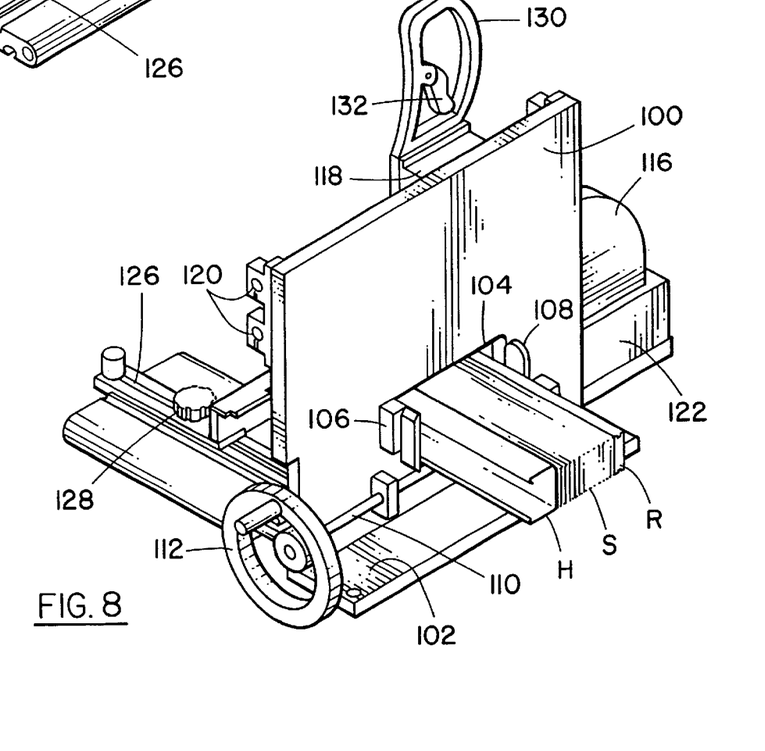
FIG. 8 is a perspective illustration of a simplified form of saw blade cut down machine where the saw blade will cut all of the blind components namely the head rail, the blind slats and the bottom rail, in a single pass of the saw blade.
Figure 9:
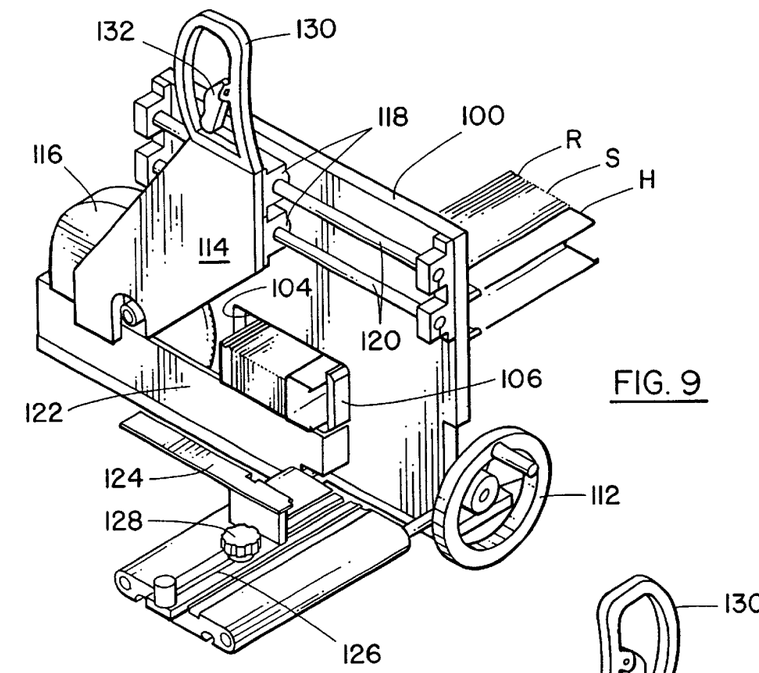
FIG. 9 is a perspective illustration of the apparatus of FIG. 8, shown from the opposite side.

A modified simplified form of apparatus for this purpose is shown in FIGS. 8 and 9.

In this simplified apparatus, a frame plate 100, is mounted on a base plate 102. A blind component opening 104 is formed in plate 100. A component buffer 106 is mounted on plate 100.

A component clamp arm 108 is mounted on screw 110 operated by hand wheel 112.

Blind components consisting of a non-metallic head rail H, blind slats S, and a bottom rail R, are all passed through the opening 104. The edge of the head rail H abutts against buffer 106, while the bottom plate is clamped by means of clamp 108, thereby securing the blind components in position for cutting.

A saw blade mounting 114, carries a rotary saw blade 116 driven by any suitable motor means (not shown). Arm 114 is secured to slide bearings 118. Bearings 118 are spaced apart from one another and ride on guide rods 120.

A collector channel 122 is secured to plate 100, and defines an opening along which blade 116 can travel. In this way, saw dust and debris from the saw blade cutting through the blind components, can fall down into the channel. The channel will be connected to a suitable vacuum source (not shown) in essentially the same manner as described above.

Blind component end stops are provided in the form of a transverse stop bar 124, mounted on a slide body 126, which is slidable to provide a fixed stop and which can be secured by means such as clamp screws 128.

The plate 114 is operated by means of a handle 130 and a trigger switch 132 is provided in handle 130, and when the trigger switch is depressed, the motor driving the blade 116 will commence operation.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A blind cut-down apparatus for cutting and sawing a blind having at least a head rail component of thin material, and blind slats of thicker material suspended from the head rail, and comprising;

a blind holding plate having at least a head rail opening and a slat opening formed therein for receiving respective components of a blind there through, and holding them in position for cutting;

a slat cutting saw moveable relative to said holding plate, for cutting blind slats extending through said holding plate;

a cutting die holder adjacent to said cutting saw, said cutting die holder carrying at least one cutting die for receiving said head rail there through, and being moveable relative to said holding plate for cutting said head rail, and, movement means for moving said cutting saw and said cutting die holder relative to said holding plate whereby both said blind slats and said head rail may be cut in a common plane along the surface of said holding plate.

2. A blind cut down apparatus as claimed in claim 1 and including a head rail cutting die secured to said holding plate, and said head rail cutting die being mounted to said die holder, whereby said head rail cutting die may move relative to said holding plate for cutting said head rail extending therethrough.

3. A blind cut down apparatus as claimed in claim 1 and further having a saw blade guide attached to said holding plate and said saw blade being moveable therealong relative to said holding plate.

4. A blind cut down apparatus as claimed in claim 1 and in which manual movement means are provides for moving both said cutting die and said saw blade, with said cutting die holder moving a short distance, and said saw blade moving a greater distance than said cutting die holder and in a common plane therewith, under the influence of a single manual operating means.

5. A blind cut down apparatus as claimed in claim 1 and including a slat clamping mechanism operable to clamp a bundle of slats extending through said holding plate, whereby to hold them stationary during operation of said saw.

6. A blind cut down apparatus as claimed in claim 1 wherein the saw blade is operated by an electric motor, the saw blade comprising a rotatable saw disk.

7. A blind cut down apparatus as claimed in claim 1 including a cutting die guide providing a cutting die movement path which is diagonal to the movement path of said saw blade.

8. A blind cut down apparatus as claimed in claim 1 including a vacuum fan and vacuum nozzle, located adjacent to said saw blade collecting saw cut debris resulting from the operation of said saw.

9. A blind cut down apparatus as claimed in claim 1 wherein the manual operation means comprises a rotary shaft, a manual lever connected to said shaft, an operating cam connected to said shaft and engaging said cutting die holder, and a movement transmission lever connected between said shaft and said saw blade, said saw blade being operable through a path of movement greater than the path of movement of said cutting die holder.

10. The method of operating a blind cut-down apparatus for cutting and sawing a blind having at least a head rail component of thin material, and blind slats of thicker material suspended from the head rail, and comprising the steps of;

positioning said blind components in a blind holding plate having at least a head rail opening and a slat opening formed therein for receiving respective components of a blind there through, and holding them in position for cutting;

securing said components in said position;

moving a slat cutting saw moveable relative to said holding plate, for thereby cutting blind slats extending through said holding plate;

moving a head rail cuffing die adjacent to said cutting saw, relative to said holding plate thereby cutting said head rail, and, said movement of said cutting saw and said cutting die cutting both said blind slats and said head rail in a common plane along the surface of said holding plate.

11. The method as claimed in claim 10 wherein the saw blade is mounted on a saw blade guide attached to said holding plate and wherein said saw blade guide is moved therealong relative to said holding plate.

12. The method as claimed in claim 11 wherein said movement is carried out by moving manual movement means for both said cutting die and said saw blade, with said cutting die moving a short distance, and said saw blade moving a greater distance than said cutting die and in a common plane therewith, under the influence of a single manual operating means.

13. The method as claimed in claim 12 and including the staep of clamping the blind slats in a slat clamping mechanism whereby to clamp a bundle of slats extending through said holding plate, whereby to hold them stationary during operation of said saw.

14. The method as claimed in claim 13 including the step of operating the saw blade by an electric motor, the saw blade comprising a rotatable saw disk.

15. The method as claimed in claim 14 including a cutting die guide, and inclding the step of moving the cutting die along a movement path which is diagonal to the movement path of said saw blade.

16. The method as claimed in claim 15 including the step of collecting saw cut debris by means of a vacuum fan and vacuum nozzle, located adjacent to said saw blade.

17. The method as claimed in claim 16 including the step of moving the saw blade through a path of movement greater than the path of movement of said cutting die.

* * * * *